Aug. 27, 1963   L. N. PLISK   3,101,549
GUN TELESCOPE MOUNTING
Filed Dec. 22, 1961

INVENTOR.
LEONARD N. PLISK
BY Frank C. Parker
ATTORNEY

United States Patent Office 3,101,549
Patented Aug. 27, 1963

3,101,549
GUN TELESCOPE MOUNTING
Leonard N. Plisk, Hilton, N.Y., assignor to Bausch & Lomb Incorporated, Rochester, N.Y., a corporation of New York
Filed Dec. 22, 1961, Ser. No. 161,583
4 Claims. (Cl. 33—50)

The present invention relates to a mounting mechanism for a gun telescope and more particularly it relates to improvements in a demountable type of telescope mounting.

Although the demountable type of telescope mounting is well represented in the prior art, these mountings have only been partially successful in use, particularly when used on large bore guns which generate heavy setback forces. The difficulty of achieving perfect telescope sight alignment during a series of shots is the cause of continued developmental efforts in the heavy caliber category. Unless the telescope mounting is so constructed as to absorb very severe setback stresses, the telescope is never seated properly for precision aiming and in some cases the telescope sight has been completely dislodged from its mounting mechanism.

In view of the above-mentioned facts, it is an object of this invention to provide a novel gun telescope mounting which is particularly designed for use on heavy caliber guns which generate abnormally high setback forces.

It is another object to provide such a device which is strong and sturdy to withstand hard use and which maintains the sighting axis of the aiming telescope in spite of severe setback and recoil jolts transmitted thereto.

Another object is to provide a heavy-duty mounting mechanism for aiming telescopes which is as simple in structure and operation and low in manufacturing cost as is consistent with precision performance.

Further objects and advantages are to be found in the form and arrangement of parts of the mounting mechanism as described in the specification herebelow taken in conjunction with the accompanying drawing, in which.

Figure 1:
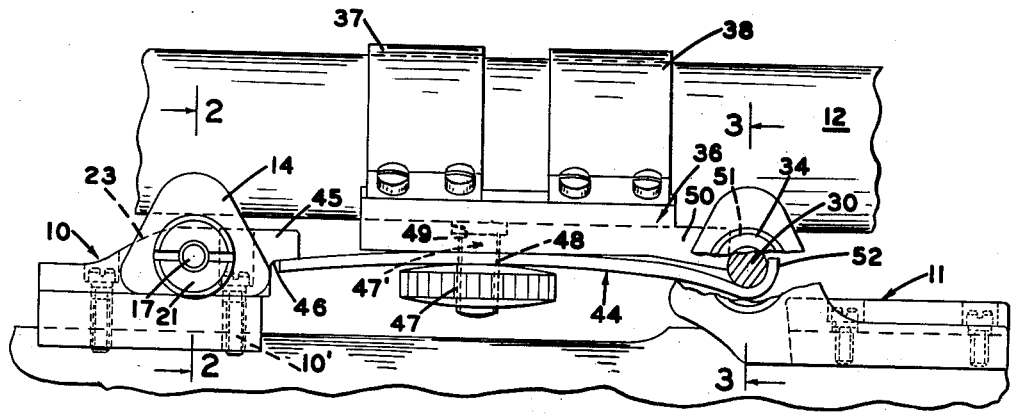
FIG. 1 is a side elevation of a gun telescope mounting constructed according to this invention having a sighting telescope held therein, parts thereof being broken away and shown in section.

The preferred form of telescope mounting mechanism is shown in FIG. 1 comprising a rear mount 10 and a front mount 11 on which a telescope 12 is held.

Figure 2:
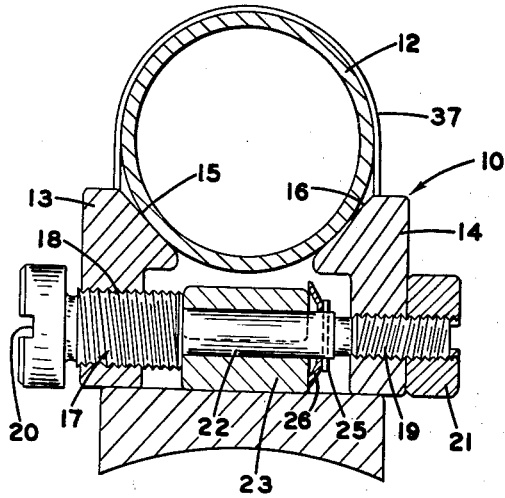
FIG. 2 is a sectional view taken on the line 2—2 of FIG. 1.
Figure 3:
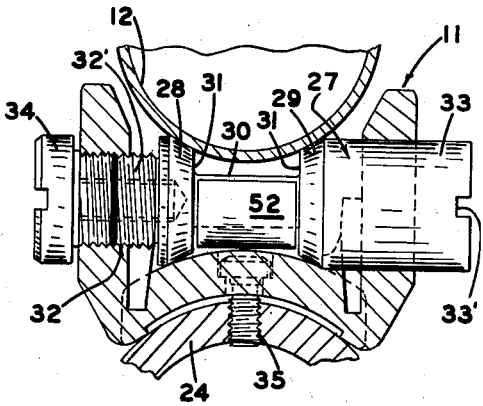
FIG. 3 is a sectional view taken on the line 3—3, parts thereof being broken away.

Said rear mount 10 is characterized by a pair of clamping jaws 13 and 14 having inclined faces 15 and 16 formed thereon which face each other so as to form a V-shaped seat for said telescope 12. For moving the jaws 13 and 14 toward and away from each other, a double-ended screw 17 having a right-hand thread 18 and a left-hand thread 19 engaged with the respective jaws is provided. The screw 17 is rotated to accomplish elevation adjustments of the telescope by a screw driver, coin or other article inserted in a slot 20 formed in the head of the screw and is locked in any desired position by a lock nut 21 which engages the opposite end of the screw. Intermediate of the respective threads 18 and 19 a smooth round portion 22 is formed on the screw 17, said portion being rotatably fitted to a corresponding bore in the upper part of a mounting block or saddle 23 which is secured to a gun receiver 24. Said screw 17 is restrained from longitudinal motion relative to the block 23 by securing an expansion pin 25 to the round part 22 of the screw as indicated in FIG. 2 and interposing a Belleville type washer 26 between the pin and block 23.

The rear mount 10 is secured on the gun barrel by means of screws 10' which are seated in the mount and are threaded into tapped holes in said receiver.

Spaced forwardly of the rear mount 10 is the front mount 11 for the telescope, said front mount comprising a spool-like support member 27 whereon is formed a pair of frusto-conical surfaces 28 and 29 facing each other so as to form a V seat on which the telescope 12 rests.

The surfaces 28 and 29 are spaced apart and integrally formed therebetween and thereon is a cylindrical neck 30 and at each end of said neck a radial shoulder 31 is formed where the frusto-conical surfaces terminate. The support member 27 is rotatably mounted in the front mount 11 at one end by a threaded connection 32 formed therein whereby the member is moved to effect windage adjustment, the other end 33 being cylindrically formed and being rotatably and slidably journaled in said mount. Means for turning said support member 27 to effect windage adjustments is provided by the open slot 33' which is formed in its outer end, and a locking screw 34 is threaded into the tapped hole which accommodates the threaded part 32' so as to abut and lock said member in a selected position. For attaching the front mount 11 to the gun receiver 24, screws 35, which extend through accommodating holes in the mount 11 and are threaded into tapped holes in the gun receiver, are provided.

Figure 4:
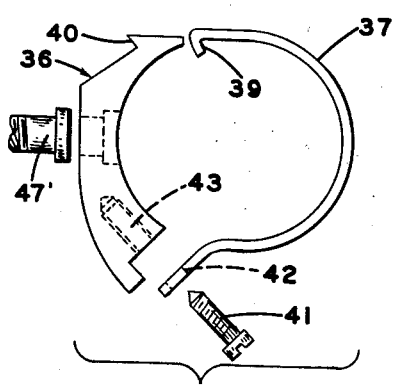
FIG. 4 is a disassembled end view of a clamping mechansim for holding said telescope.
Figure 5:
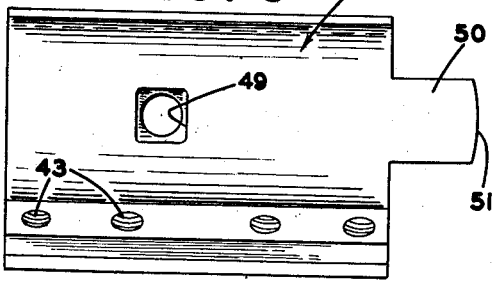
FIG. 5 is a top view of a part of said clamping mechanism.

A clamping mechanism is provided for holding the telescope on the aforesaid V-shaped seats comprising a clamp ring base 36 as best shown in FIGS. 4 and 5 which is clamped to said telescope by a pair of clamp rings 37 and 38. Said rings have a hook 39 formed at one end for engagement beneath a shoulder 40 formed on said base 36 and the other ends of the rings are secured against said base 36 by a clamp screw 41 which extends through a hole 42 in the end of the clamp ring and are threaded into a tapped hole 43 therein.

For resiliently holding the scope on its seats yieldably so as to permit windage and elevational movements thereof, a single leaf half elliptic type of clamping spring 44 is provided which bears at its rear end on the underside of an anchor lug 45. Said lug is formed on the front part of the mounting block 23 and is provided with a flat undersurface 46 on which the spring end bears, said surface being amply spaced away from the gun receiver to afford easy placement of the spring end thereon. The front end of the spring 44 bears against the underside of the neck 30 and a clamping nut 47 is provided for applying clamping pressure to firmly seat the telescope by threading the nut onto a captive stud 47' which is suitably held in the base 36 and extends considerably below said spring. As shown in FIG. 1, said stud 47' extends through a hole 48 in the spring 44 and is non-rotatably held in the base 36 by a square head formed thereon, said head being fitted within a squared recess 49 formed in the base 36.

One of the features of this invention is the provision of an abutment nose 50 on the front part of the clamp base 36 and the formation thereon of a vertical abutment surface 51 which is located in close abutting relation to the cylindrical neck 30 and is confined between the radial shoulders 28 and 29 adjacent to the neck. This construction is rugged and strong for the purpose of transmitting the heavy axial "setback" force back to the telescope at the time that the gun is fired, and such a construction is particularly necessary and advantageous when used with high energy modern hunting rifles.

Another of the features of the clamping structure is directed to the means for preventing displacement of the telescopic sight due to reverse recoil forces. Such means comprise a hook-like extension 52 formed on the front end of the spring 44 so as to curl upwardly around the forward part of the neck 30, said extension being fitted between the radial shoulders 31 so as to move laterally along with the frusto-conical surfaces 28 and 29. The forwardly directed recoil force is thereby transmitted from the neck 30 through the spring extension 52 and body of the spring 44 and through the clamping screw 47′ and clamp base 36 to the telescope. The hole 48 is so located between the ends of the spring 44 that a substantially equal clamping force is applied by the clamping mechanism to each of the mounts 10 and 11.

Another feature of the clamping mechanism resides in the fact that the lower or working surface of the anchor lug 45 is made flat so that the spring end may move laterally thereon while windage adjustments are being effected. The close confinement of the spring extension 52 and the abutment nose 50 between the opposed radial shoulders 28 and 29 causes the rear spring end to slide on said lug 45 so that the described construction is necessary to the proper operation of the mounting mechanism while adjusting for windage.

When assembling the telescope 12 on the mounting mechanism, the spring 44 is first placed beneath its end supports 45 and 30 and then the empty stud 47′ on the telescope clamp base 36 is inserted through the hole 48 of the spring, meantime lowering the telescope onto the aforesaid V seats. Lastly, the nut 47 is screwed onto the stud sufficiently to apply clamping pressure through the telescope as the spring 44 is deflected.

It will be realized that although only a preferred form of this invention has been shown and described in detail, other forms of the details thereof are possible and changes and modifications may be made in the parts thereof without departing from the spirit of the invention, as defined in the appended claims.

What is claimed is:

1. A mounting mechanism for a gun sighting telescope, said mechanism including a front and a rear mount fixed to a gun, the front mount comprising a support member which is laterally movably mounted and having a pair of conical surfaces facing each other to form a V shaped seat on which the telescope rests, a cylindrical neck on said member extending between said conical surfaces, means on said rear mount for supporting said telescope, an anchor lug integrally formed on the rear mount so as to extend forwardly thereof along and adjacent to said telescope, a clamp ring base fixedly secured to the telescope between said mounts, a vertical abutment surface formed on the front part of said base in abutting relation to said cylindrical neck, a flat single leaf type of clamping spring seated at the forward end under said cylindrical neck and at the rear end under said lug so as to be initially spaced from said base, and means operatively connected to said base for deflecting the center portion of said spring under spring stress toward said base to clamp the telescope on the mounts.

2. A mounting mechanism for a gun sighting telescope according to claim 1 characterized by the last-named means being comprised of a clamping nut and threaded stud extending through an opening in said spring whereon the nut is threaded beneath the spring whereby the spring may be deflected to clamp the telescope while permitting slight pivotal motion of the spring about said stud.

3. A mounting mechanism for a gun telescope according to claim 2 wherein the front portion of the flat spring is being confined between a pair of shoulders which are formed at the ends of said cylindrical neck, and the surface on which the rear end of the spring bears is formed flat so that said end may slide during windage movements of said seat.

4. A mounting mechanism for a gun sighting telescope as set forth in claim 1 further characterized by the front end of spring spring having a hook-like form extending beneath and upwardly across said cylindrical element to prevent displacement of the telescope during recoil of the gun.

References Cited in the file of this patent
UNITED STATES PATENTS

| | | |
|---|---|---|
| 2,125,828 | Turner | Aug. 2, 1938 |
| 2,365,976 | Sorenson | Dec. 26, 1944 |
| 2,576,347 | Jones | Nov. 27, 1951 |
| 2,621,410 | Street | Dec. 16, 1952 |
| 2,632,253 | Stith | Mar. 24, 1953 |